Patented May 13, 1952

2,596,945

UNITED STATES PATENT OFFICE 2,596,945

COPOLYMERS OF 1-ALKENYL NITRILES AND ALLYLIC ESTERS OF AROMATIC DICARBOXYLIC ACIDS

Edward C. Shokal, Oakland, and Carl W. Schroeder, Berkeley, Calif., assignors to Shell Development Company, San Francisco, Calif., a corporation of Delaware No Drawing. Application March 24, 1947, Serial No. 736,614

9 Claims. (Cl. 260—78.5)

This invention relates to a new class of polymers. More particularly the invention relates to the copolymerization of certain allyl-type esters of aromatic polycarboxylic acids with unsaturated nitriles, and to the copolymers thereof.

More specifically the invention may be described as relating to the copolymerization of certain allyl-type esters of aromatic polycarboxylic acids, preferably diallyl phthalate, with unsaturated nitriles to produce copolymers which possess the highly desired properties of having an increased rate of gelation, increased degree of hardness and infusibility as well as a high resistance to the action of water and organic solvents. These properties render the novel copolymers far superior to known resins of the unsaturated nitriles, and enable the copolymers of the invention to be used for a great many industrial purposes for which the inferior resins of the art are entirely unsuited.

Unsaturated nitriles have, in general, shown promise in the production of resinous products capable of industrial use. Many of the unsaturated nitriles, however, have certain faulty characteristics which prevent them from being used to produce resinous products of general application. The rate of gelation, i. e. the rate of formation of the first insoluble solid gel which may be molded to the desired shape, of many of the unsaturated nitriles, for example, is excessively long, which increases production costs, decreases production efficiency and makes the production of some products almost impossible. Furthermore, many of the resulting polymers of the unsaturated nitriles are fusible, soft, and have a solubility in general organic solvents such as acetone, chloroform or toluene which prevents the polymers from being used in the production of products that might be subjected to heat or to the presence of organic solvents. Such faulty characteristics have made the commercial production of many of the unsaturated nitrile polymers highly unfeasible.

It is an object of the invention therefore, to provide polymers of the unsaturated nitriles which have an increased rate of gelation, increased degree of hardness and infusibility as well as a high resistance to the action of organic solvents and water. It is a further object of the invention to provide polymers of the unsaturated nitriles having the above-described desired properties which may be produced in an economical and practical manner and may be used for a great many industrial applications for which the inferior resins of the art are entirely unsuited. Other objects of the invention will be apparent from the detailed description given hereinafter.

It has now been discovered that polymers containing the unsaturated nitriles and possessing many of their desired properties as well as possessing an increased rate of gelation, increased hardness and infusibility as well as a high resistance to the action of water and organic solvents may readily be produced in an economical manner by the copolymerization with the unsaturated nitrile of a specific amount of an allyl-type ester of an aromatic polycarboxylic acid, preferably diallyl phthalate. The production of polymers possessing such desired properties by the copolymerization with the unsaturated nitrile of a specific amount of the allyl-type esters of the aromatic polycarboxylic acids such as diallyl phthalate is highly surprising in view of the teaching of the past art that diallyl phthalate and other related compounds possess a slow rate of gelation and their copolymerization with other compounds would tend only to decrease the gelation rate of the resulting polymer. Furthermore, the degree of hardness and infusibility of the polymers of the invention is much higher than the degree of hardness and infusibility of the straight diallyl phthalate polymers which is likewise surprising and unpredictable in view of the relatively soft and fusible nature of the unsaturated nitrile polymers.

The unsaturated nitriles with which the allyl-type esters of aromatic polycarboxylic acids are polymerized to produce the polymers of the invention may be broadly described as compounds having the general structural formula $$R—CN$$

wherein R is an unsaturated hydrocarbon or unsaturated heterocyclic radical.

The unsaturated hydrocarbon radical represented by R in the above structural formula may be cyclic or acyclic or aromatic such as the alkenyl, alkenaryl, aralkenyl, cycloalkenyl, etc. radicals. The degree of unsaturation should generally consist of at least one double bond for every six carbon atoms. Examples of such unsaturated hydrocarbons are propenyl, 2-butenyl, 2-pentenyl, 2,4-hexadienyl, cyclopentenyl, 2,4-dimethyl-3,5-octadienyl, 2-heptenyl, 2,4,6-octatrienyl, etc. radicals.

The unsaturated heterocyclic radicals represented by R in the above formula of the unsaturated nitriles includes those heterocyclic radicals wherein an oxygen, nitrogen, sulfur, etc. atom or atoms are included in the ring system. Examples of such radicals are the furfuryl, thiophenyl, sulfolanyl, pyridinyl, etc. radicals.

Representative examples of unsaturated nitriles coming within the scope of the invention are vinylacetonitrile
crotonitrile
isocrotonitrile
fumaronitrile
alpha-furfuryl acrylonitrile
alpha-methyl-beta-pentenonitrile
alpha-gamma-butadienonitrile
beta-hexyl acrylonitrile A group of the unsaturated nitriles which are highly preferred because of exceptionally fine resinous products produced on their polymerization with the allyl esters of aromatic polycarboxylic acids are the alpha-beta unsaturated nitriles which have the general structural formula

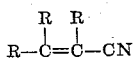

wherein R represents the same or different substituent comprising a hydrogen atom or hydrocarbon radical having from 1 to 10 carbon atoms. The hydrocarbon radical may be saturated or unsaturated and cyclic or alicyclic. Examples of such hydrocarbon radicals are methyl, ethyl, propyl, butyl, sec-butyl, allyl, methallyl, pentenyl, hexyl, hexenyl, octyl, isooctyl, 2,5-dimethyl-octyl, cyclopentyl, cyclohexenyl, phenyl, tolyl, etc.

Examples of the preferred alpha-beta unsaturated nitriles are acrylonitrile
methacrylonitrile
crotonitrile
alpha-ethyl acrylonitrile
alpha-propyl acrylonitrile
alpha,beta-dimethyl acrylonitrile
beta-butyl acrylonitrile
alpha-phenyl acrylonitrile
alpha-pentyl-beta-ethyl acrylonitrile
alpha-allyl acrylonitrile
alpha-cyclopentyl-beta-ethyl acrylonitrile
beta-methallyl acrylonitrile
alpha-ethyl-beta-octyl acrylonitrile
beta-hexyl acrylonitrile
alpha-cyclohexyl-beta-ethyl acrylonitrile The unsaturated nitriles may be produced by any suitable method. One suitable method for producing the unsaturated nitriles comprises treating the amide of the desired unsaturated hydrocarbon with phosphorus pentoxide or with phosphorus pentachloride to produce the nitrile of the said hydrocarbon. Another method comprises treating the halide of the desired unsaturated hydrocarbon with silver cyanide or potassium cyanide to produce the nitrile of the unsaturated hydrocarbon.

While diallyl phthalate is the preferred allyl-type ester of aromatic polycarboxylic acids to be copolymerized with the above-described unsaturated nitriles to produce the polymers possessing the desired properties, there are other related allyl-type esters of aromatic polycarboxylic acids which may also be polymerized with the unsaturated nitriles to produce the desired polymers. Such a class includes the esters of allyl-type alcohols and substituted or unsubstituted aromatic acids possessing at least two free carboxylic groups.

Examples of the aromatic polycarboxylic acids which may be used to produce the desired allyl-type esters are phthalic acid, isophthalic acid, terephthalic acid, 3,5-dichlorophthalic acid, 2-ethyl-5-bromoterephthalic acid, 2,3,5-trichloroterephthalic acid, 4,5-dibromoisophthalic acid, 2-hydroxy-5-chloroterephthalic acid, 3-acetyl-5-ethylphthalic acid, etc.

At least one of the carboxyl groups and preferably all of the carboxyl groups of the aromatic polycarboxylic acids are esterified by allyl-type alcohols. By the term "allyl-type" alcohol is meant those alcohols having an unsaturated linkage, preferably a double bond, between two carbon atoms of aliphatic character one of which is joined to a carbon atom bearing the hydroxyl group. Allyl-type alcohols have the structure

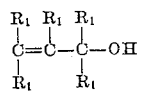

wherein each $R_1$ is the same or different substituent comprising the hydrogen atom, halogen atoms and organic radicals. Allyl-type alcohols embraced by invention are those wherein the $R_1$ of the above general formula is the same or different substituent comprising the hydrogen atom, halogen atoms and substituted or unsubstituted hydrocarbon radicals containing from 1 to 8 carbon atoms. Examples of such substituted or unsubstituted hydrocarbon radicals are methyl, ethyl, propyl, propenyl, 2-chloro-butyl, 3-bromo-pentyl, cyclopentyl, cyclohexyl, heptyl, octyl, cyclohexenyl, 4-bromo-heptyl, 2,4-hexadienyl, etc.

Examples of allyl-type alcohols that may be used to esterify the aromatic polycarboxylic acids are allyl alcohol, methallyl alcohol, chloro-allyl alcohol, 2-buten-1-ol, 4-bromo-2-hexen-1-ol, 2-penten-1-ol, 2-butyl-2-hexen-1-ol, 2-chloro-methyl-2-hepten-1-ol, etc. It is preferred to have all the carboxyl groups of the aromatic polycarboxylic acid molecule esterified by the allyl-type alcohols, however, in some cases some of the carboxyl groups may be esterified with other short-chained unsaturated alcohols such as vinyl alcohol.

The production of the allyl-type esters of the aromatic polycarboxylic acids may be accomplished by an suitable method. Such methods include the regular esterification of the alcohol with the acid in the presence of esterification catalysts such as concentrated sulfuric acid or the ester exchange method of treating an ester of the aromatic polycarboxylic acid with the desired allyl-type alcohol.

Representative examples of the preferred allyl-type esters of aromatic polycarboxylic acids which may be used to produce the polymers of the invention are diallyl phthalate
diallyl isophthalate
dimethallyl terephthalate
allyl vinyl isophthalate
chloroallyl methallyl phthalate
allyl methallyl isophthalate
allyl crotyl terephthalate
crotyl vinyl phthalate
allyl crotyl tetrachloroisophthalate
dicrotyl phthalate
diallyl tetrachlorophthalate
dimethallyl tetrachloroisophthalate
bis-(methylethylvinylcarbinyl) phathalate
bis-(isopropenylmethylethylcarbinyl) isophthalate
bis-2-hexenyl phthalate
dimethallyl 2,5-dichloroterephthalate
bis-bromoallyl 2-chlorophthalate A single unsaturated nitrile may be polymerized with a single allyl-type ester of aromatic polycarboxylic acid or a mixture of one or both of the components may be used. For example, diallyl phthalate may be copolymerized with a mixture of methacrylonitrile and crotonintrile or a mixture of diallyl phthalate and allyl vinyl isophthalate may be copolymerized methacrylonitrile, etc.

The unsaturated nitriles and the allyl-type esters of aromatic polycarboxylic acids may be in the monomeric form or may be partially polymerized before being introduced into the mixture to be polymerized. By the term "partially polymerized" is meant any state of polymerization existing between the monomeric state and the state of being completely polymerized. For example, partially polymerized diallyl phthalate may be copolymerized with monomeric methacrylonitrile or monomeric diallyl phthalate may be copolymerized with partially polymerized methacrylonitrile, etc.

The unsaturated nitriles and allyl-type esters may also be copolymerized in the presence of already-formed plastics, including natural resins, cellulose derivatives, synthetic resins, etc. Other modifiers, including plasticizers, stabilizers, lubricants, dyes, pigments and fillers may be added during the polymerization process provided they do not chemically react with or otherwise adversely affect the ingredients of the reaction mixture, otherwise, these modifiers may be added following polymerization. Examples of modifying agents and pigments that may be added are wood flour, wood fiber, paper dust, clay, zein, glass wool, mica, granite dust, silk flock, cotton flock, steel wool, cloth, sand, titanium oxide, lead oxide chrome yellow, lead cyanamide, zinc cyanamide, gums, oils, wax, etc.

The compounds may be polymerized in bulk in the presence or absence of a solvent or diluent or mixtures thereof. If a solvent is used the substance may be a solvent for the reactants and polymer, or may be a solvent for the reactants and a non-solvent for the polymer. Emulsifying, granulating and wetting agents may also be present. It is also possible to effect polymerization by atomizing the reactants or solutions thereof in the form of a fine spray into a heated chamber containing an inert gas. It is likewise feasible to polymerize the unsaturated nitriles and the allyl-type esters when they are dispersed in the interstices of fibrous material such as a fabric.

To produce polymers possessing the desired properties the proportion of the allyl-type ester of aromatic polycarboxylic acid copolymerized with the unsaturated nitrile may vary between certain specific limits. It has been found that when the amount of the allyl esters added to the nitriles varies within the limits of about 3% to about 75% of the weight of the nitrile there is a decided increase in the rate of gelation, increased degree of hardness and infusibility and a higher resistance to organic solvents and water of the unsaturated nitrile polymer. Maximum increases in the rate of gelation are, in general, obtained when the amount of the allyl ester to be added varies between about 5% to about 45% of the total nitrile being polymerized. Amounts added in excess of that required to obtain the maximum gelation speed usually tends to increase the hardness and resistance to water and organic solvents, but, in general, the maximum effects of all desired properties are obtained between the preferred range of allyl esters to be added to the nitriles of between about 5% to about 45% of nitrile weight. The exact amount of the allyl ester to be used within the specific limits, however, will depend upon the specific unsaturated nitrile and allyl-type ester of aromatic polycarboxylic acids being used and upon the type of product desired, and is readily determined for each particular case.

The polymerization is usually energized by the application of heat, although both heat and light may be used, and in some cases, light is sufficient. Temperatures between about 60° C. and about 160° C. are preferred, although higher or lower temperatures can be used. A still more preferred temperature range is about 65° C. to about 75° C.

Atmospheric, reduced, or superatmospheric pressures may be used in the polymerization process. In those cases where the polymerization temperature is maintained above the normal boiling point of the unsaturated nitrile being employed, increased pressures should be maintained to prevent the boiling away of the nitrile. The polymerization process may also be carried out under a blanket of an inert gas such as nitrogen or carbon dioxide if desired or necessary.

Catalyst may be added to hasten the polymerization. The preferred catalysts are those which are soluble in the polymerizable material. Benzoyl peroxide has been found very satisfactory. Other suitable polymerization catalysts are acetyl peroxide, benzoyl acetyl peroxide, lauroyl peroxide, dibutyryl peroxide, succinyl peroxide, di(tertiarybutyl) peroxide, sodium peroxide, barium peroxide, tertiary alkyl hydroperoxides such as tertiary butyl hydroperoxide, peracetic acid, etc. If desired mixtures of polymerization catalyst can be used. The amount of the catalyst used will vary under the various conditions but ordinarily will be between about 0.01% to about 5% by weight of the materials being polymerized, although it is not necessary to limit this range. In some cases it may be desirable to conduct the polymerization in the concurrent presence of both a catalyst and an inhibitor of polymerization for the purpose of controlling the rate thereof or of producing a product of certain desired properties.

The polymerization reaction can be carried to completion without substantial interruption or it may be stopped at any point short of completion. Incomplete polymerization may be used for the production of a syrup which may be further worked and eventually substantially completely polymerized. The syrup, for instance, may be transferred to a mold of any desired configuration and again subjected to polymerization conditions, or it may be used in coating operations, or in impregnating bibulous, e. g. fibrous material which in turn may be used in the production of laminates. As the polymers of the invention have a relatively short gelation period the polymerization may be interrupted at the formation of a gel and the gel formed into any desired shape and again subjected to polymerization conditions. Unreacted monomer may be separated from its mixture with polymer by solvent extraction, distillation or other suitable methods. The separated polymer may then be worked up in any known or special manner.

The polymers of the invention are characterized by their relatively short gelation period, their increased degree of hardness and infusibility as well as their high resistance to the action of water and organic solvents. When completely polymerized the resins may be made in the form of sheets, rods, tubes, thin films, filaments, fibers, etc. In such forms they may be fabricated into a variety of articles such as buttons, cups, beakers, boxes, etc. which are characterized by their high resistance to heat and to the action of organic solvents. Such properties also make them adaptable, in the form of partially polymerized resins, to be used as surface protective coatings such as coatings for walls, desks, wire, concrete, porcelain, etc. In a partially polymerized, flowable condition without the use of solvents they may be used as impregnants for many porous bodies such as cork, pottery, felts or fabricated bodies with interstices such as the windings of electrical coils, netted fiber, interwoven fibrous materials, etc. The polymers of the invention may also be used in the preparation of laminates of paper, wood, glass sheets, rubber sheets, fibrous material such as milk, synthetic fibers in filament, cellulose derivatives in sheet or fiber form, etc.

To illustrate the manner in which the invention may be carried out the following examples are given. It is to be understood, however, that the examples are for the purpose of illustration and the invention is not to be regarded as limited to the specific unsaturated nitrile or the allyl-type ester of aromatic polycarboxylic acid being polymerized or by the proportion of reactants, temperature or catalyst being recited.

Example I

About 95 parts of monomeric methacrylonitrile are mixed with about 5 parts of monomeric diallyl phthalate. To the mixture is added about 2% by weight of benzoyl peroxide. The combined mixture is then subjected to a polymerization temperature of 65° C. The insoluble gel of the polymer forms after about 30 hours of polymerization (about a 15% decrease in gelation time over the polymerization of the straight monomeric methacrylonitrile). At the end of 144 hours of polymerization the polymer is a hard, infusible resin with a very high resistance to water and chloroform and toluene.

Example II

About 75 parts of partially polymerized acrylonitrile are mixed with about 25 parts of monomeric diallyl phthalate. After addition of 2% by weight of benzoyl peroxide the mixture is subjected to polymerization temperature of about 65° C. The gelation time is decreased about 20% and at the end of the 144 hour polymerization period the polymer is a hard, infusible resin with a high resistance to organic solvents and water.

Example III

Methacrylonitrile and diallyl phthalate are polymerized together with about 2% by weight of benzoyl peroxide at 65° C. for 144 hours with the following results:

| Diallyl phthalate (percent by weight of methacrylonitrile) | Results |
| --- | --- |
| 2% | regular gel period of methacrylonitrile fusible resin, acted on by solvents. |
| 4% | short gel period, hard, infusible resin, resistant to solvent action of chloroform, etc. |
| 45% | short gel period, hard, infusible resin, resistant to solvent action. |
| 75% | relatively short gel period, hard, infusible resin, general resistance to solvent action. |
| 80% | extended gel period, soft, fusible resin. |
| 95% | extremely long gel period, soft fusible gel. |

Example IV

In the manner described in Example I about 45 parts of diallyl phthalate are mixed with 55 parts of crotonitrile and about 2% by weight of benzoyl peroxide. The resulting polymer has a shortened gel period and at the end of 144 hours heating at 65° C. is a hard, infusible resin having general resistance to chloroform and toluene.

Example V

In the manner described in Example I about 25 parts of chloromethallyl phthalate is mixed with 75 parts of the following nitriles: alpha-ethyl acrylonitrile, alpha-propyl acrylonitrile, beta-butyl acrylonitrile, isocrotonitrile, oleonitrile, alpha-phenyl acrylonitrile, and alpha-allyl acrylonitrile. The resulting polymers are hard, infusible resins having a shortened gel period with a high resistance to organic solvents.

Example VI

About 75 parts of methacrylonitrile are added to about 25 parts of the following allyl-type esters of aromatic polycarboxylic acids with about 2% by weight of benzoyl peroxide and heated to 65° C. for about 144 hours; diallyl isophthalate, dimethallyl terephthalate, allyl vinyl isophthalate, chloroallyl methallyl phthalate, diallyl tetrachorophthalate, dicrotyl phthalate and dibromoallyl phthalate. The resulting polymers are hard, infusible resins having a shortened gel period with a high resistance to organic solvents.

We claim as our invention:

1. A copolymer comprising the product obtained by completely polymerizing a mixture containing as its sole polymerizable components diallyl phthalate and methacrylonitrile wherein the amount of diallyl phthalate in the mixture is between 5% and 45% by weight of the methacrylonitrile.

2. A copolymer comprising the product obtained by completely polymerizing a mixture containing as its sole polymerizable components diallyl phthalate and methacrylonitrile wherein the amount of the diallyl phthalate in the mixture is between 3% and 75% by weight of the methacrylonitrile.

3. A copolymer comprising the product obtained by completely polymerizing a mixture containing as its sole polymerizable components diallyl phthalate and acrylonitrile wherein the amount of diallyl phthalate in the mixture is between 5% and 45% by weight of the acrylonitrile.

4. A copolymer comprising the product obtained by completely polymerizing a mixture containing as its sole polymerizable components methacrylonitrile and a diester of phthalic acid wherein both carboxyl groups are esterified with a beta,gamma-monoolefinic monohydric alcohol containing from 3 to 11 carbon atoms, the amount of the said diester of phthalic acid in the mixture being between 5% and 45% by weight of the methacrylonitrile.

5. A copolymer comprising the product obtained by completely polymerizing a mixture containing as its sole polymerizable components acrylonitrile and a diester of phthalic acid wherein both carboxyl groups are esterified with a beta,gamma-monoolefinic monohydric alcohol containing from 3 to 11 carbon atoms, the amount of the said diester of phthalic acid in the mixture being between 5% and 45% by weight of the acrylonitrile.

6. A copolymer comprising the product obtained by completely polymerizing a mixture containing as its sole polymerizable components an unsaturated nitrile of the formula R—CN wherein R is a 1-alkenyl radical, and a diester of an aromatic dicarboxylic acid wherein the two carboxyl groups are attached directly to carbon atoms of an aromatic ring and are esterified with a beta,-gamma-monoolefinic monohydric alcohol containing from 3 to 11 carbon atoms, the amount of the said diester in the mixture being between 3% and 75% by weight of the unsaturated nitrile.

7. A copolymer defined in claim 6 wherein the diester in the mixture is between 5% and 45% by weight of the unsaturated nitrile.

8. A copolymer as defined in claim 6 wherein the diester is diallyl phthalate.

9. A copolymer as defined in claim 6 wherein the unsaturated ester is a diester of the aromatic dicarboxylic acid wherein the two carboxyl groups are attached directly to the aromatic ring and are esterified with allyl alcohol.

EDWARD C. SHOKAL.
CARL W. SCHROEDER.

REFERENCES CITED

The following references are of record in the file of this patent:

UNITED STATES PATENTS

| Number | Name | Date |
|---|---|---|
| 2,202,846 | Garvey et al. | June 4, 1940 |
| 2,332,900 | D'Alelio | Oct. 26, 1943 |
| 2,340,111 | D'Alelio | Jan. 25, 1944 |
| 2,456,428 | Parker | Dec. 14, 1948 |
| 2,496,384 | DeNie | Feb. 7, 1950 |

OTHER REFERENCES

Mast et al., "Vulcanized Acrylic Resins," published in Ind. Eng. Chem., Nov. 1944, pages 1027–1031.